(12) United States Patent
Ewalts et al.

(10) Patent No.: US 11,397,051 B2
(45) Date of Patent: Jul. 26, 2022

(54) DRY DUST REMOVAL FROM FURNACE GAS

(71) Applicant: DANIELI CORUS B.V., Velsen Noord (NL)

(72) Inventors: Wouter Bernd Ewalts, Nieuw Vennep (NL); Pieter Dirk Klut, Castricum (NL)

(73) Assignee: DANIELI CORUS B.V., Velsen Noord (NL)

( * ) Notice: Subject to any disclaimer, the term of this patent is extended or adjusted under 35 U.S.C. 154(b) by 517 days.

(21) Appl. No.: 15/770,054

(22) PCT Filed: Oct. 14, 2016

(86) PCT No.: PCT/EP2016/074769
§ 371 (c)(1),
(2) Date: Apr. 20, 2018

(87) PCT Pub. No.: WO2017/067862
PCT Pub. Date: Apr. 27, 2017

(65) Prior Publication Data
US 2020/0240711 A1      Jul. 30, 2020

(30) Foreign Application Priority Data

Oct. 20, 2015  (EP) .................................. 15190639

(51) Int. Cl.
*F27D 17/00*     (2006.01)
*C21B 7/22*      (2006.01)
(Continued)

(52) U.S. Cl.
CPC .............. *F27D 17/008* (2013.01); *C21B 7/22* (2013.01); *C21C 5/38* (2013.01); *F27D 2019/0006* (2013.01); *F27D 2019/0056* (2013.01)

(58) Field of Classification Search
CPC .......... F27D 17/008; F27D 2019/0006; F27D 2019/0056; C21B 7/22; C21C 5/38
See application file for complete search history.

(56) References Cited

U.S. PATENT DOCUMENTS

| 2,842,193 A | 7/1958 | Ballestra |
| 3,431,707 A | 3/1969 | Berg |

(Continued)

FOREIGN PATENT DOCUMENTS

| CN | 1037541 A | 11/1989 |
| CN | 1966730 A | 5/2007 |

(Continued)

OTHER PUBLICATIONS

Office Action from Chinese patent application No. 201680069278.1, dated Mar. 28, 2019, with English translation.

(Continued)

*Primary Examiner* — Scott R Kastler
(74) *Attorney, Agent, or Firm* — Steven M. Koehler; Westman, Chamiplin & Koehler, P.A.

(57) ABSTRACT

A process and a plant for cleaning furnace gas includes utilizing one or more sensors to continuously monitor one or more parameters indicative for an expected temperature peak in the blast furnace gas flow. The gas flow is then passed through a conditioning tower. In case the measured parameter exceeds a predefined limit value, a coolant, such as water, is sprayed into the blast furnace gas flow in the conditioning tower. Subsequently the flow of blast furnace gas passes one or more filter stations.

20 Claims, 4 Drawing Sheets

(51) Int. Cl.
*C21C 5/38* (2006.01)
*F27D 19/00* (2006.01)

(56) References Cited

U.S. PATENT DOCUMENTS

| | | | |
|---|---|---|---|
| 3,483,674 | A | 12/1969 | Wendel et al. |
| 3,726,065 | A | 4/1973 | Hausberg et al. |
| 4,055,331 | A | 10/1977 | Hegemann |
| 4,155,725 | A | 5/1979 | Van Ackeren et al. |
| 4,668,253 | A | 5/1987 | Lonardi et al. |
| 4,909,160 | A | 3/1990 | Frick et al. |
| 6,328,790 | B1 | 12/2001 | Schwab |
| 2002/0083831 | A1* | 7/2002 | Jorget .................... B01D 5/009 95/57 |
| 2010/0158773 | A1 | 6/2010 | Schwab |

FOREIGN PATENT DOCUMENTS

| | | |
|---|---|---|
| CN | 201179403 Y | 1/2009 |
| DE | 2743550 A1 | 4/1979 |
| DE | 3715188 A1 | 4/1988 |
| EP | 1139023 A1 | 10/2001 |
| FR | 2719499 A1 | 11/1995 |
| GB | 1526478 A | 9/1978 |
| JP | S60-209226 A | 10/1985 |
| JP | S63109109 A | 5/1988 |
| JP | H02-85310 A | 3/1990 |
| JP | 2001-276547 A | 10/2001 |
| RU | 2430971 C2 | 10/2011 |
| WO | 2013/045534 A1 | 4/2013 |

OTHER PUBLICATIONS

International Search Report and Written Opinion dated Dec. 16, 2016 for corresponding International Application No. PCT/EP2016/074769, filed Oct. 14, 2018.

Zhang Fu-Ming, "Study on Dry Type Bag Filter Cleaning Technology of BF Gas at Large Blast Furnace", Proceedings of the 5th International Congress on the Science and Technology of Ironmaking, p. 612-616, 2009, Shanghai, China.

Lanzerstorfer and Xu, "Neue Entwicklungen zur Gichtgasreinigung von Hochofen: ein Überblick", BH, vol. 195, p. 91-98, 2014.

Examination Report from the Indian Patent Office for Indian patent application No. 201847016646, dated Oct. 6, 2020.

Notification of Reasons for Refusal for Japanese Patent Application No. 2018-540211, dated Oct. 5, 2020, with English translation.

Craig et al. "SVAI Gas Cleaning Options—A Solution for Every Problem", AISTech 2012 Proceedings, 2012, pp. 87-96.

Fleischanderl et al. "Advanced Dry Gas Cleaning for Iron- and Steelmaking", AISTech 2014 Proceedings, 2014, pp. 127-135.

Lajtonyi, A. and Corus, D. "Raw Materials and Ironmaking: Blast Furnace Gas Cleaning Systems", Millennium Steels, 2006, pp. 57-65.

Remus et al. "Best Available Techniques (BAT) Reference Document for Iron and Steel Production", JRC Reference Report, 2013, European Commission Joint Research Centre, Brussels, 10 pages.

Wallace et al. "Chapter 9: The Blast Furnace Facility and Equipment", The AISE Steel Foundation, The Making Shaping and Treating of Steel Ironmaking vol. 1999, 11th Edition, Pittsburgh, PA., 5 pages.

"Gas Cooling and Conditioning in Cement Manufacturing A Guide to Improving Efficiency, Increasing Throughput, Reducing Downtime and Lowering Costs", Spraying Systems Co. Experts in Spray Technology, 2003, Bulletin No. 556, Wheaton IL, 16 pages.

"AutoJet Gas Cooling System", Spraying Systems Co. Experts in Spray Industry, 2009, Bulletin No. 627A, Wheaton IL, 4 pages.

* cited by examiner

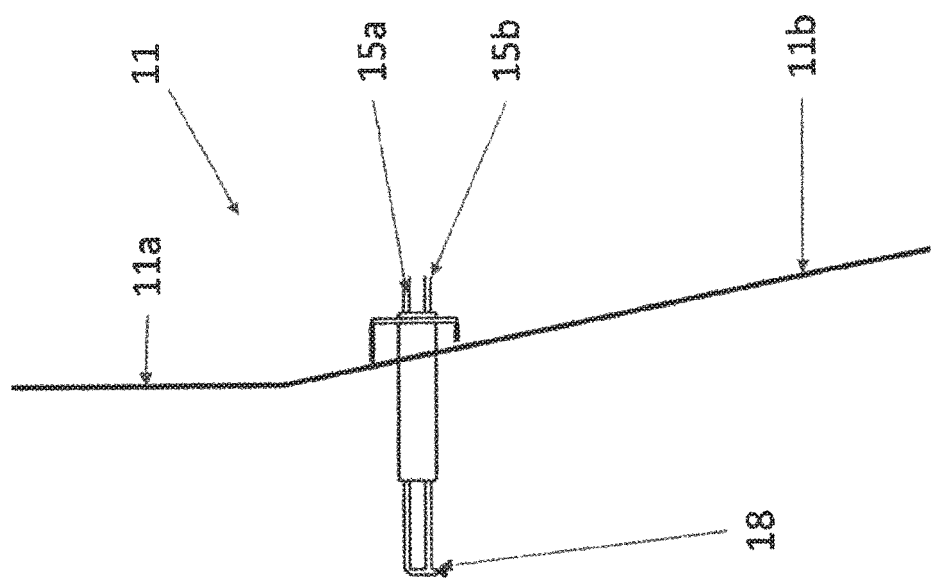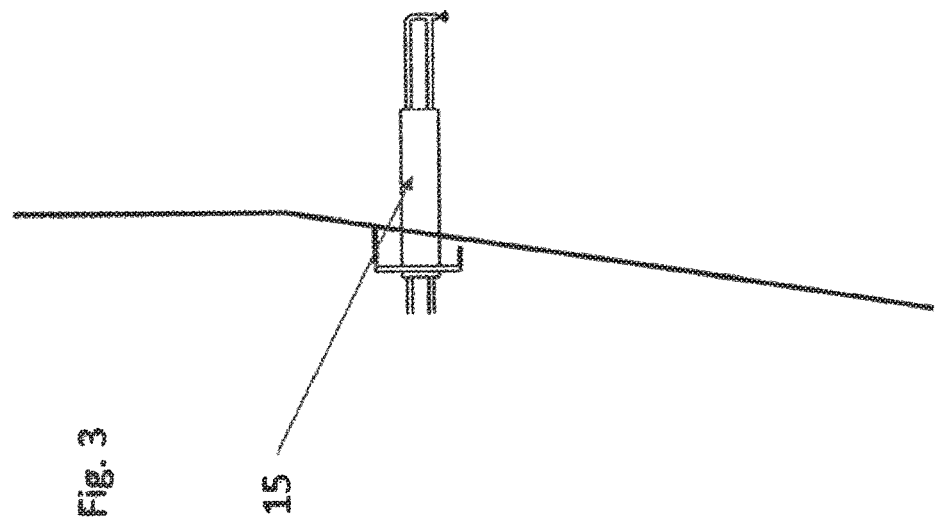

DRY DUST REMOVAL FROM FURNACE GAS

CROSS-REFERENCE TO RELATED APPLICATION

The present application is a national stage filing of International patent application Serial No. PCT/EP2016/074769, filed Oct. 14, 2016, and published as WO 2017/067862 A1 in English which claims priority to European patent application Serial No. 15190639.3 filed on Oct. 20, 2015.

TECHNICAL FIELD

The present disclosure relates to a process for dry dust removal from furnace gas resulting from metal production processes, such as blast furnace gas or gas produced with electric arc furnaces (EAF), basic oxygen furnaces (BOF) or with direct reduced iron (DRI) processes. The present disclosure also relates to a plant for carrying out such a process.

BACKGROUND

The discussion below is merely provided for general background information and is not intended to be used as an aid in determining the scope of the claimed subject matter. Blast furnace gas typically has a relatively high carbon monoxide content, e.g., about 20-28%, allowing use as a fuel gas in various types of burners. However, the dust content of blast furnace gas leaving the blast furnace is too high for a stable functioning of the burners, so the dust content of the blast furnace gas must be lowered substantially. This is usually done with a two-step process. In a first step the larger dust particles are separated in a cyclone. In a second step the smaller particles are separated, usually by means of a scrubber in a wet process. Such a wet process requires significant water consumption and produces sludge and waste water, which require further treatment. The water scrubbing treatment also results in a drop of pressure and temperature of the treated blast furnace gas, which reduces its efficiency as a fuel gas in a downstream gas burner.

To overcome the drawbacks of wet gas cleaning processes it has been proposed to filter the gas by means of filter bags, for instance in the article of Zhang Fu-Ming, "Study on Dry Type Bag Filter Cleaning Technology of BF Gas at Large Blast Furnace", Proceedings of the 5$^{th}$ International Congress on the Science and Technology of Ironmaking, p. 612-616, 2009, Shanghai, China, and in Lanzerstorfer and Xu, "Neue Entwicklungen zur Gichtgasreinigung von Hochofen: ein Uberblick", BH, vol. 195, p. 91-98, 2014.

Blast furnace gas leaving the blast furnace during normal operation typically has a temperature of about 80-200° C., but due to process dynamics in the blast furnace, the blast furnace gas temperature can peak to about 600-1000° C. or more. If filter bags are used to clean the blast furnace gas these temperature peaks will overheat and damage the filter bags.

To detect temperature peaks WO 2013/045534 proposes to monitor pressure changes in the blast furnace gas. In case of a sudden pressure peak water is sprayed into the gas flow, e.g., in a pipe line between a cyclone and a filter station. The drawback of such water cooling is that the water contaminates the blast furnace gas and raises its water content. Furthermore, the sprayed droplets need to be evaporated completely, since liquid water contributes to clogging of the downstream filter bags.

It is an object of the present disclosure to top off the temperature peaks of furnace gas by injecting a liquid coolant, while assuring complete evaporation of the sprayed droplets.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

The object of the present disclosure is achieved with a process for cleaning blast furnace gas, comprising the following steps:

one or more sensors are used to continuously monitor one or more parameters indicative for an expected temperature peak in the blast furnace gas flow. The monitored parameter can for instance include the upstream temperature of the gas flow, e.g., at the off-take of the gas flow furnace, and/or pressure peaks, as taught by WO 2013/045534, or any other suitable parameter.

the blast furnace gas flow is then passed through a conditioning tower;

in case the measured parameter exceeds a predefined limit value, a coolant, such as water, is sprayed into the blast furnace gas flow in the conditioning tower;

subsequently the flow of blast furnace gas passes one or more filter stations, in particular bag filter stations.

The residence time in a conditioning tower will typically be long enough to evaporate all sprayed water before the gas flow leaves the conditioning tower with the prevailing process pressures and temperatures in the blast furnace gas flow. Due to the coolant spray suspended particles in the gas flow may coagulate or agglomerate enabling efficient separation of the particles from the blast furnace gas flow.

In a specific embodiment, the coolant is sprayed co-currently with the blast furnace gas flow, e.g., at an upstream end of a conical section widening in flow direction, e.g., in a downward flow direction. For example, the conical section may have a cone angle of about 3-9 degrees, e.g., about 6 degrees. These measures contribute to a low turbulent or even non-turbulent flow allowing full evaporation of droplets and minimization of wall contact.

The mean residence time in the conditioning tower may for example be about 3 to about 8 seconds, typically about 5 to about 6 seconds. Longer or shorter residence times may also be used, if so desired. The flow velocity of the blast furnace gas flow is typically about $10^5$-$8.10^5$ Nm$^3$/h. To obtain the mentioned residence time with such flow velocities, the volume of the tower between the nozzles and the outlet of the tower may for example be in the range of 80 to 1800 m3. In a specific embodiment the space between the nozzles and the outlet of the tower may have a height to diameter ratio of at least 2.5, e.g., at least 3, wherein the diameter is the diameter at the bottom of the conditioning tower.

The pressure of the blast furnace gas flow is typically about 200-300 kPa, e.g., about 250 kPa. This pressure can be maintained in the conditioning tower.

The coolant will typically be water, although other suitable coolants can also be used. Optionally, the water may contain additives, such as coagulant agents.

The blast furnace gas entering the conditioning tower typically comprises a number of acidic and organic contaminants, such as hydrogen chloride, hydrogen fluoride, carbonyl sulfide and hydrogen sulfide. These can be removed by injecting basic agents into the gas flow, e.g., in the conditioning tower or downstream the conditioning tower. These can for example be sprayed with the coolant, e.g., as a dissolved agent in the spraying water. Alternatively, or additionally, they can be added separately to the gas flow in the conditioning tower and/or downstream the conditioning tower, e.g. in the pipe line leading the gas flow to a filter station. The basic agents can be added as a dry compound or as an aqueous solution. Suitable compounds include calcium carbonate, sodium carbonate (soda), hydrated lime or mixtures thereof.

Other typical contaminants of blast furnace gas include heavy metals, polycyclic aromatic hydrocarbons (PAH), benzene, toluene and xylene (BTX). These can be removed by injecting adsorbents into the blast furnace gas flow, e.g., as a mixture with the reagents for neutralizing the acidic contaminants. The adsorbents may for instance comprise active carbon, lignite coke or a fine grade zeolite.

The water can be sprayed using one or more nozzles. The amount of water to be sprayed may for instance be any suitable amount up to about 200 m$^3$/h, or even higher, if so desired.

The setpoint for the outlet temperature of the conditioning tower may for example be at least 150° C., e.g., at most 250° C., e.g., about 200° C.

After the monitored parameter is back to an acceptable level, the spraying may stop. All injected coolant will be evaporated and no residual droplets will reach downstream filter bag modules.

In a specific embodiment, the downward gas flow is deflected upwardly above a dust collecting unit. This will separate larger coagulated particles from the gas flow. The separated particles are collected and discharged. For example, with a 6.10$^5$ Nm$^3$/h blast furnace, about 200-500 kg of dust can be collected per hour.

The process can be carried out with a blast furnace plant comprising a blast furnace with an off-take for blast furnace gas and a downstream conditioning tower comprising nozzles connected to a coolant supply line, e.g., a water supply line. Optionally the plant may comprise more than one blast furnace and/or more than one downstream conditioning towers.

In a specific embodiment the nozzles, or at least a part of them, are directed in flow direction to enable co-current spraying of the coolant with the blast furnace gas flow. Alternatively, all or part of the nozzles may be arranged for counter-current spraying. Examples of suitable nozzles include two phase nozzles, e.g., using an inert gas, such as nitrogen or steam to atomize the coolant. The water flow capacity per nozzle may for example be between about 5-100 liter per minute.

To provide a vertical downward gas flow, the conditioning tower may for example comprise a blast furnace gas inlet at its top section and a blast furnace gas outlet at its bottom section. The bottom section may for example taper down to a dust discharge for discharging coagulated particles.

In a specific embodiment, the conditioning tower may comprise a side exit and a pipe section having a downwardly directed inlet inside the conditioning tower and an outlet connected to the side exit. To enter the downwardly directed inlet, the downward gas flow be deflected upwardly. This separates larger dust particles from the gas flow. The downwardly directed inlet may for example be an upwardly pointing cone-shaped mouth piece with an open bottom side. This cone-shaped mouth piece may for example be positioned centrally above the tapering bottom section.

To collect separated particles the blast furnace plant may for example comprise a lock hopper connected to a bottom of the conditioning tower by a discharge line.

The blast furnace plant will typically comprise one or more first dust removing devices, such as a cyclone or a dust catcher, between the off-take of the blast furnace and the conditioning tower. Such a cyclone or dust catcher can be used to separate the larger dust particles. To remove the finer dust particles, the blast furnace plant may comprise one or more further dust removal devices downstream the conditioning tower. These downstream dust removing devices may for example be filter stations, e.g., comprising filter bags and/or electrostatic precipitators.

BRIEF DESCRIPTION OF THE DRAWINGS

Aspects of the invention will be explained with reference to the accompanying drawings, showing an exemplary embodiment.

FIG. 3: shows the nozzles within the conditioning tower of the plant of FIG. 1;

DETAILED DESCRIPTION

Figure 1:
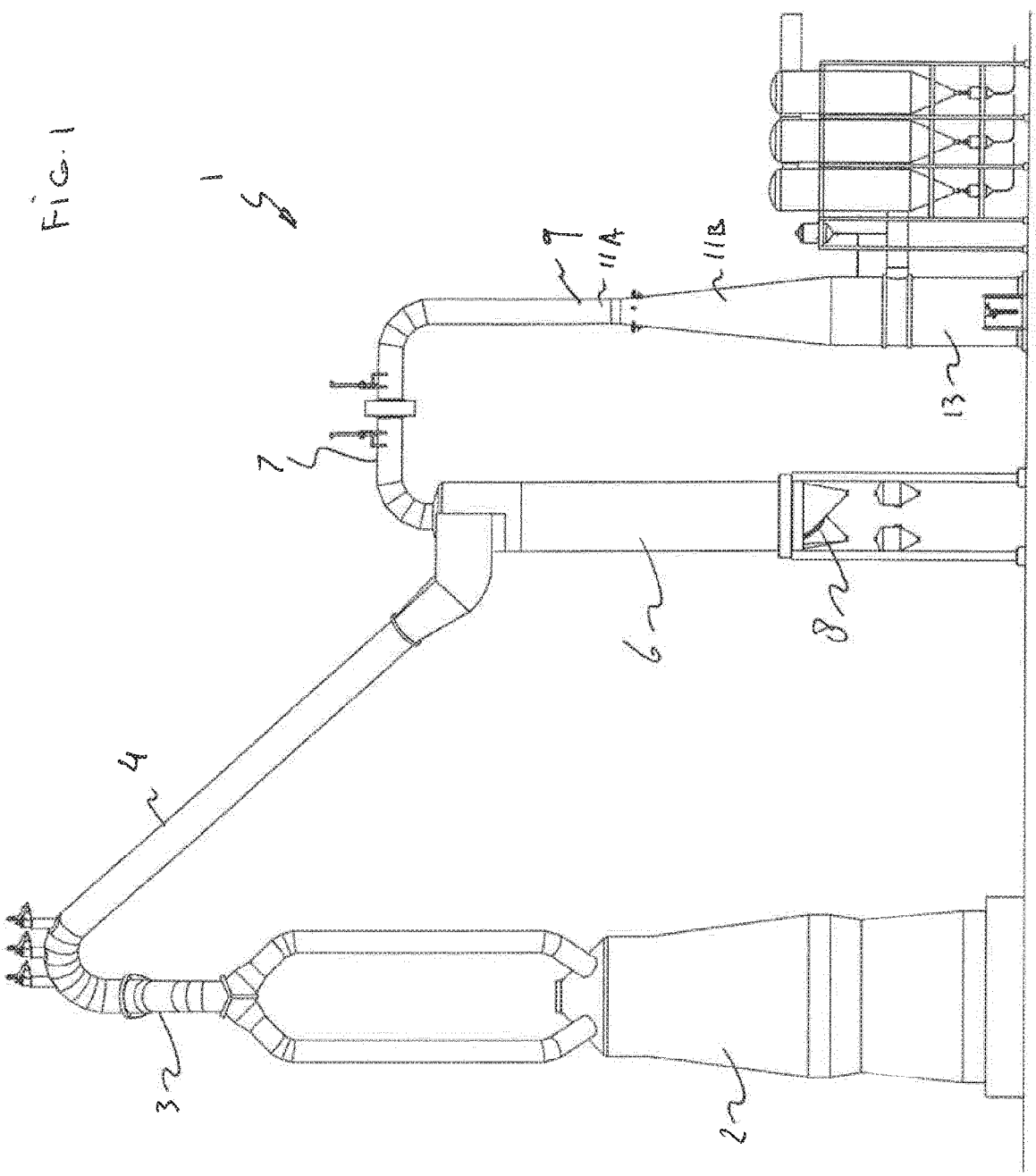
FIG. 1: shows an exemplary embodiment of a blast furnace plant in side view.
Figure 2:
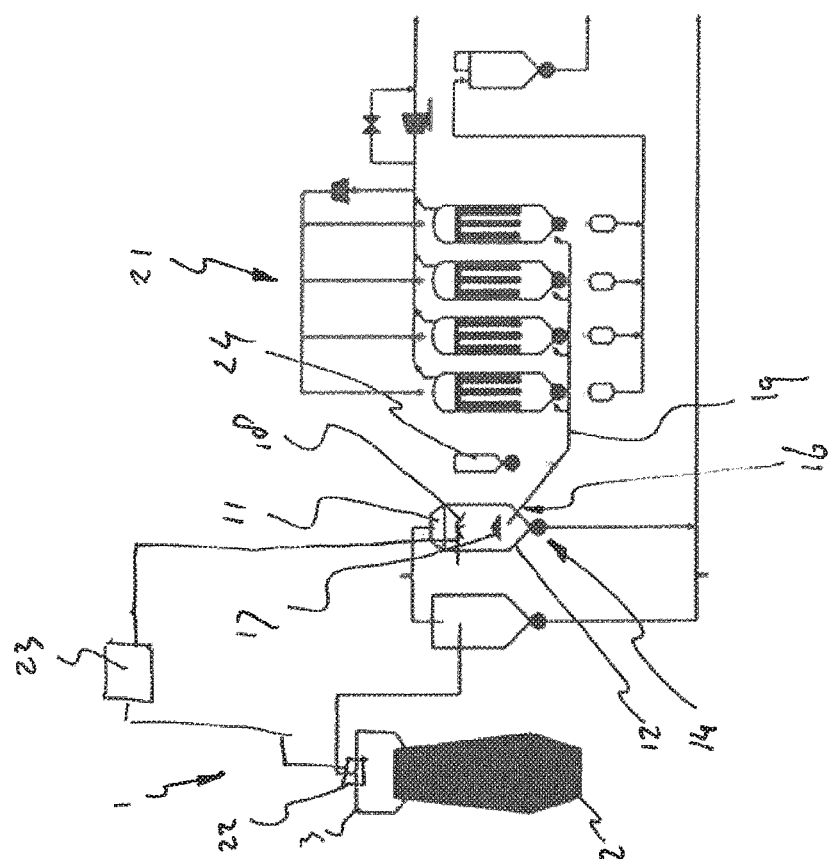
FIG. 2: shows the plant of FIG. 1 schematically in side view.

FIG. 1 shows a blast furnace plant 1, shown schematically in FIG. 2. The plant 1 comprises a blast furnace 2 with a gas take-off 3 connected to a line 4 leading to a cyclone 6, where larger dust particles are separated from the gas flow. The cyclone 6 has a gas outlet at its top end connected to a gas discharge line 7, and a dust outlet 8 at its bottom connected to a dust discharge line for collecting and discharging dust.

The gas discharge line 7 leads the gas flow to an inlet 9 at the top end of a conditioning tower 11. The conditioning tower 11 has a tapering bottom section 12 (see FIG. 2; in FIG. 1 this is surrounded by a cylindrical wall 13), tapering down to a dust discharge outlet 14. At a distance above the dust outlet 14 the conditioning tower 11 comprises a side exit 16 for gas with a flow deflector 17 deflecting the downward gas flow upwardly, as will be explained hereinafter with reference to FIG. 4.

FIG. 3 shows a middle section of the conditioning tower 11 in cross section. The interior of the conditioning tower 11 comprises a series of radially extending spray lances 15 crossing the wall of the conditioning tower 11. The spray lances 15 have downwardly directed nozzles 18 close to a vertical centerline of the condition tower 11. In an alternative embodiment the nozzles may be upwardly directed. The nozzles 18 are two-phase nozzles with a supply line 15a for pressurized nitrogen and a supply line 15b for water. The nitrogen serves as an atomizing gas for the water. Instead of nitrogen alternative inert atomizing gases can be used, such as steam.

The conditioning tower 11 has a cylindrical top section 11a connected to a conical middle section 11b which widens in downward direction. The spray lances 15 are positioned at a top end of the conical section 11b, close the transition to the cylindrical top section 11a of the conditioning tower 11. This position of the lances 15 promotes a good distribution of the cooling water.

A gas discharge line 19 (see FIG. 2) runs from the side exit 16 to a number of bag filter stations 21. The gas is distributed over the gas filter stations 21 and subsequently the cleaned gas is recollected. The clean gas can be used as a fuel for hot blast stoves or gas turbines.

At the gas off-take 3 the temperature of the passing blast furnace gas is continuously measured using one or more sensors 22. If the gas temperature passes a limit, e.g. 180° C., the one or more sensors 22 send a warning signal to a control unit 23. The control unit 23 is configured to activate the spray nozzles 18 in the conditioning tower 11. If the gas temperature in the off-take 3 drops below the limit, the sensors 22 send a second signal to the control unit 23. In response to the second signal the control unit 23 deactivates the spray nozzles 18.

In this exemplary embodiment, the length and the diameter of the conditioning tower 11 is such that the mean residence time of the blast furnace gas is at least 5 seconds.

A temperature peak in the blast furnace gas flow typically occurs for about 2-10 minutes. During that time water is sprayed to reduce the temperature peak.

Figure 4:
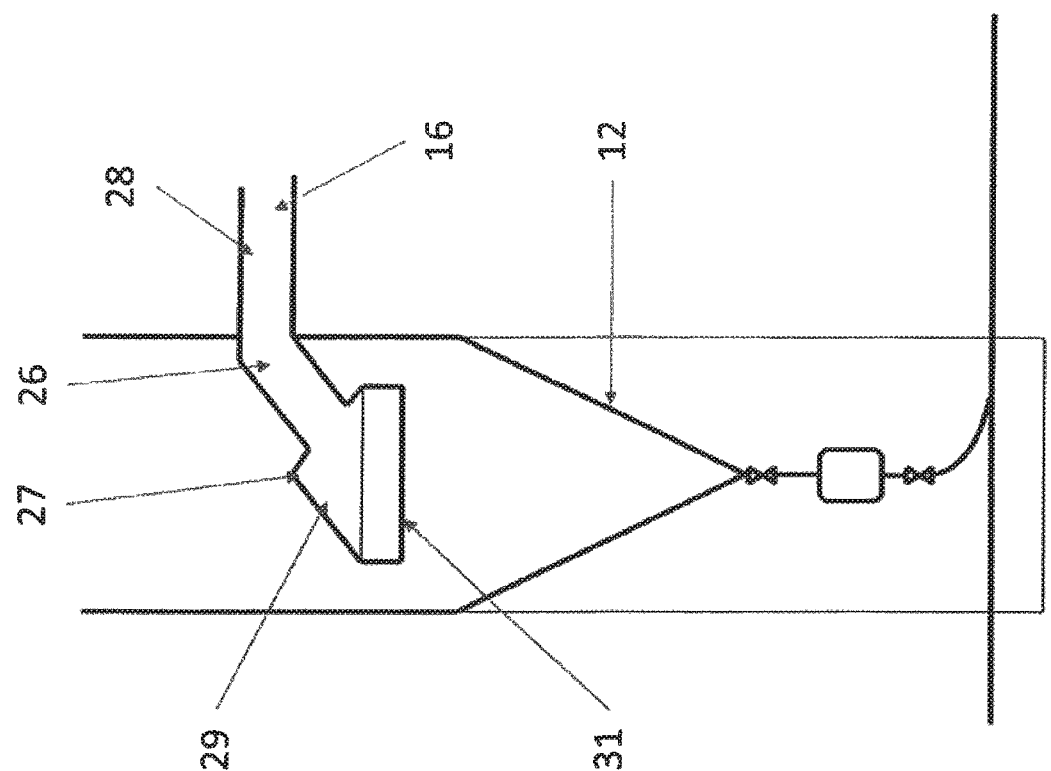
FIG. 4: shows a bottom section of the conditioning tower.

FIGS. 3 and 4 show the nozzles 18 in more detail. After topping off the temperature peaks the blast furnace gas can be transferred to the bag filters 21 without damaging the filter material. In the line 19 from the conditioning tower 11 to the filter stations 21 basic compounds and/or adsorbents can be injected into the gas flow at an injection station 24 to remove contaminants. For instance, a mixture may be injected comprising hydrated lime and active coal. To maintain the moisture content as low as possible these compounds can be added as a dry powder.

In the conditioning tower 11 the separated dust and injected absorbents are collected and discharged at the bottom section 12. To this end the conditioning tower 11 comprises a pipe section 26 having a downwardly directed inlet 27 and an outlet 28 connected to the side exit 16. The downwardly directed inlet 27 is an upwardly pointing cone-shaped mouth piece 29 with an open bottom side 31. The cone-shaped mouth piece 29 is positioned centrally above the tapering bottom section 12. The downward flow direction of the blast furnace gas is deflected by the cone-shaped mouth piece 29 to an upward direction towards the side exit 16. Larger particles will not follow this deflection of the flow direction and will be separated from the gas flow and collected in the tapering bottom section 12 of the conditioning tower 11.

The invention claimed is:

1. A process for cleaning blast furnace gas flowing from a blast furnace via a dust removing device to one or more filter stations, comprising:
   continuously monitoring, with one or more sensors, one or more parameters indicative of a temperature peak in the blast furnace gas flow;
   in case the one or more parameters exceeds a predefined limit value, spraying a coolant into the blast furnace gas flow;
   after passing the blast furnace gas through the dust removing device to remove some dust particles from the blast furnace gas and before passing the one or more filter stations, flowing the blast furnace gas from an outlet of the dust removing device through a gas discharge line to an inlet at a top section of a conditioning tower that is separate from the dust removing device;
   flowing the blast furnace gas as a uniform and non-turbulent flow downward through the conditioning tower to a blast furnace gas outlet below the inlet and at or near a bottom of the conditioning tower;
   spraying the coolant through nozzles co-currently or counter-currently into the blast furnace gas flow through the conditioning tower, wherein during a residence time in the conditioning tower the coolant evaporates before the blast furnace gas passes the blast furnace gas outlet in the conditioning tower; and
   collecting dust from the blast furnace gas in the conditioning tower separate from dust collected from the dust removing device.

2. The process of claim 1, wherein the one or more parameters includes a temperature of the blast furnace gas flow measured at an off-take of the blast furnace.

3. The process of claim 1 wherein a mean residence time of the blast furnace gas in the conditioning tower is at least 3 seconds.

4. A plant for the production of steel or iron, the plant comprising:
   a blast furnace with an off-take for blast furnace gas;
   a dust removing device connected to the off-take to receive blast furnace gas through a dust removing device inlet and discharge blast furnace gas through a dust removing device outlet;
   a gas discharge line connected to the dust removing device outlet;
   one or more filter stations;
   one or more sensors configured to continuously monitor one or more parameters indicative of a temperature in the blast furnace gas flow;
   nozzles connected to a coolant supply line;
   a conditioning tower separate from the dust removing device and comprising a blast furnace gas inlet at a top section of the conditioning tower connected to the gas discharge line and a blast furnace gas outlet below the blast furnace gas inlet at or near a bottom of the conditioning tower, the blast furnace gas outlet leading to the one or more filter stations, wherein the conditioning tower comprises the nozzles, the nozzles configured to inject coolant in a flow direction or in a counter-flow direction of the blast furnace gas, wherein a distance between the nozzles and the blast furnace gas outlet of the conditioning tower is configured to allow full evaporation of the coolant during a residence time of the blast furnace gas in the conditioning tower, and wherein the conditioning tower is configured to collect dust separate from dust collected by the dust removing device.

5. The plant of claim 4, wherein the nozzles are positioned at an upstream end of a conical section of the conditioning tower, which conical section widens in flow direction.

6. The plant of claim 5, wherein the conical section has a cone angle of 3-9 degrees.

7. The plant of claim 4, wherein the blast furnace gas outlet comprises a side exit and a pipe section having a downwardly directed inlet and an outlet connected to the side exit.

8. The plant of claim 7, wherein the downwardly directed inlet is an upwardly pointing cone-shaped mouth piece with an open bottom side.

9. The plant of claim 8, wherein the bottom section of the conditioning tower tapers down to a dust outlet, wherein the cone-shaped mouth piece is positioned centrally above the tapering bottom section.

10. The plant of claim 4, comprising a lock hopper connected to the bottom of the conditioning tower by a discharge line.

11. The plant of claim 4, wherein the dust removing device is a cyclone or dust catcher.

12. The plant of claim 4, wherein the conditioning tower has a volume of 80 to 1800 m3.

13. An assembly for processing blast furnace gas, the assembly comprising:
   a dust removing device connected to off-take to receive blast furnace gas through a dust removing device inlet and discharge blast furnace gas through a dust removing device outlet;
   a gas discharge line connected to the dust removing device outlet;
   one or more sensors configured to continuously monitor one or more parameters indicative of a temperature in the blast furnace gas flow;
   nozzles connected to a coolant supply line; and
   a conditioning tower separate from the dust removing device and comprising a blast furnace gas inlet at a top section of the conditioning tower connected to the gas discharge line and a blast furnace gas outlet below the blast furnace gas inlet at or near a bottom of the conditioning tower, wherein the conditioning tower is configured to provide non-turbulent blast furnace gas flow therein, wherein the conditioning tower comprises the nozzles, the nozzles configured to inject coolant in a flow direction or in a counter-flow direction of the blast furnace gas, wherein a distance between the nozzles and the blast furnace gas outlet of the conditioning tower is configured to allow full evaporation of the coolant during a residence time of the blast furnace gas in the conditioning tower, and wherein the conditioning tower is configured to collect dust separate from dust collected by the dust removing device.

14. The assembly of claim 12, wherein the nozzles are positioned at an upstream end of a conical section of the conditioning tower, which conical section widens in flow direction.

15. The assembly of claim 14, wherein the conical section has a cone angle of 3-9 degrees.

16. The assembly of claim 13, wherein the blast furnace gas outlet comprises a side exit and a pipe section having a downwardly directed inlet and an outlet connected to the side exit.

17. The assembly of claim 16, wherein the downwardly directed inlet is an upwardly pointing cone-shaped mouth piece with an open bottom side.

18. The assembly of claim 17, wherein the bottom section of the conditioning tower tapers down to a dust outlet, wherein the cone-shaped mouth piece is positioned centrally above the tapering bottom section.

19. The assembly of claim 13, wherein the conditioning tower has a volume of 80 to 1800 m3.

20. The assembly of claim 13, wherein the dust removing device is a cyclone or dust catcher.

* * * * *